Jan. 11, 1955     S. F. BROWN     2,698,986
FISHING LINE AND PROCESS OF MAKING LOOPS THEREIN
Original Filed March 8, 1951
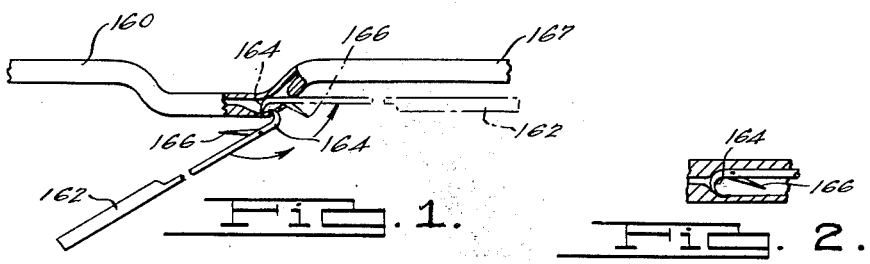
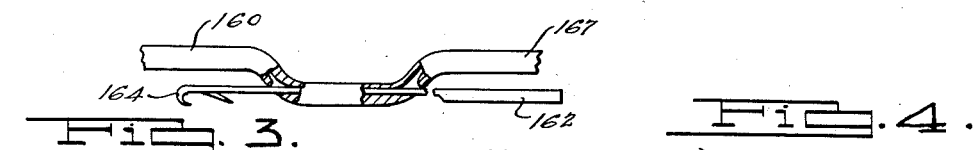
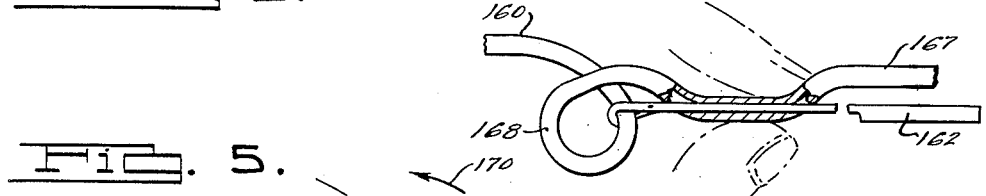
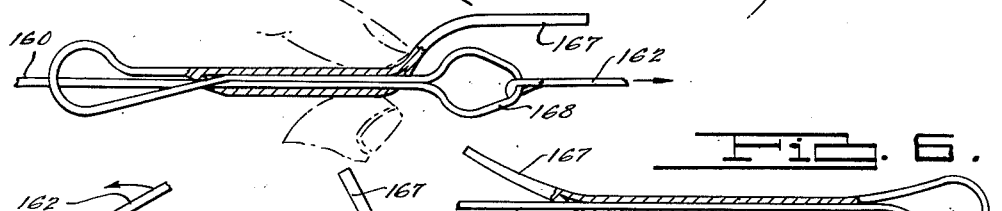
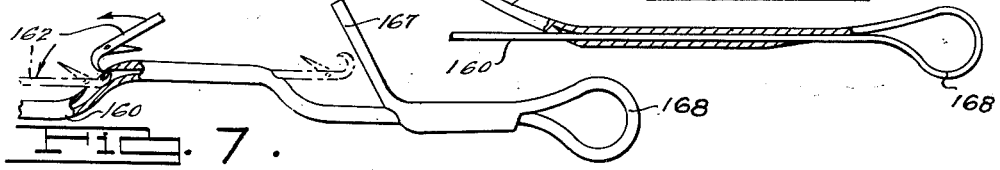
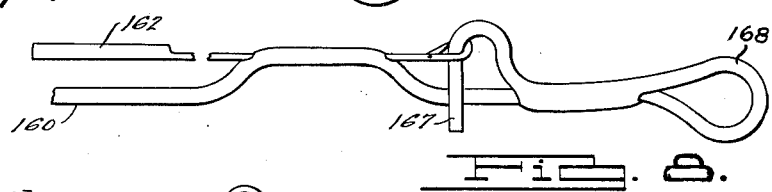
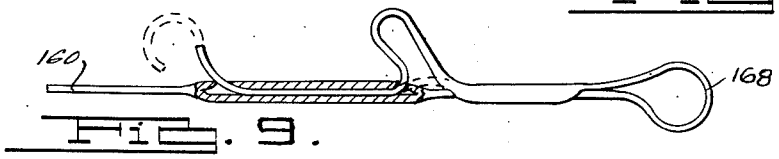
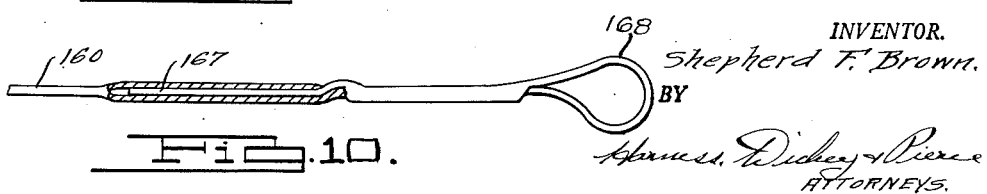
INVENTOR.
Shepherd F. Brown.
BY
ATTORNEYS.

United States Patent Office

2,698,986
Patented Jan. 11, 1955

2,698,986

FISHING LINE AND PROCESS OF MAKING LOOPS THEREIN

Shepherd F. Brown, Meredith, N. H.

Original application March 8, 1951, Serial No. 214,480. Divided and this application January 17, 1952, Serial No. 266,975

4 Claims. (Cl. 28—72)

This invention relates to new and useful improvements in a process of making loops in thin, tubular lines such as fishing lines and leaders therefor and to the article thus produced.

This is a division of my copending application Serial No. 214,480, filed March 8, 1951.

An important object of the invention is to provide a quick and efficient method or process of making loops in a fishing line and the like.

In the drawing forming a part of this specification and wherein like numerals are employed to designate like parts throughout the same, Figs. 1–10 illustrate successive steps in the formation of a loop according to the present invention at the end of a tubular threadlike member such as a fishing line or leader.

Figs. 1–10 illustrate a novel and convenient method of forming a loop at the end of a tubular woven fishing line 160 or the like. The particular method here shown provides a double lock for the looped end which effectively prevents the loop from pulling out or loosening. If desired, of course, the locked end of the line can be seized by means of the machine and procedures hereinabove described. In most instances, however, where the loop is formed in the manner described, seizing is unnecessary.

The method can be performed most conveniently with the aid of a conventional needle 162 of the type having a hooked end 164 and provided with a pivoted latch 166 movable between the position shown in Figs. 1 and 4.

In practice, the hooked end 164 of the needle 162 is inserted into the hollow bore of the line 160 as shown in Fig. 1 and then pushed through a section of the line (Fig. 2). The needle 162 is then pushed out of the line 160 and to the position shown in Fig. 3. The length of line through which the needle is passed may vary considerably depending on the exigencies of the particular situation. A distance of approximately one inch is ample for the particular situation here being described. As shown, the needle is inserted into the line at a point spaced substantially from the end thereof and is pushed away from the end of the line so that it extends or projects from the line in a direction away from the terminal portion 167.

The portion of line 160 adjacent the projecting end of needle 162 is then formed into a loop 168 and the loop is engaged with the hooked end 164 of the needle, as shown in Fig. 4. The latch 166 is engaged with the hooked end to hold the loop 168 attached to the needle 162.

The next step in the operation is to pull needle 162 backwardly through the pierced section of the line so as to pull the loop 168 therethrough as shown in Fig. 5.

After the loop 168 has been pulled through the pierced section of the line, the needle 162 is disengaged therefrom, and the terminal portion 167 is pulled in the direction of arrow 170. This operation pulls the loop 168 tight and causes the pierced section of the line to turn inside out. After the loop 168 has been pulled entirely through the pierced section, the line assumes the appearance illustrated in Fig. 6. In this form, the line has the loop 168 at one end thereof and the terminal portion 167 extends away from the loop 168.

The next step is to insert needle 162 through a second section of the line 160, which second section is spaced from but adjacent to the first pierced section. As shown in Fig. 7, the needle is inserted toward the looped end 168, and the needle emerges from the line adjacent the terminal 167. The needle 162 is then engaged with the terminal 167 and retracted through the second pierced section to pull the terminal therethrough as shown in Fig. 9. After the terminal 167 has been pulled tight as shown by the dotted-line position in Fig. 9, the projecting end thereof is trimmed close to the line so that the severed end slips back into the line as shown in Fig. 10. This completes the operation.

It will be observed from the foregoing that the procedure described provides a loop 168 on the end of the line and that the unique manner in which the loop is formed provides a double lock for the loop end. The tubular line tends to constrict on the line sections which extend therethrough when an axial pull is exerted against the loop 168, and this constricting action of the line assists in holding the threaded sections in the line. The double lock, looped end thus formed is far superior to the conventional knotted loop. It eliminates the tendency of a knot to cut the line and provides a loop that will not pull free or loosen under pressure. In the case of a conventional woven fishline, the above operations do not weaken the line since the needle 162 is inserted between the woven thread. None of the threads or strands which make up the line are severed.

The loop is particularly serviceable at the end of the fly line as it eliminates a knot heretofore necessary. Also, the loop has particular utility on the end of the leader where leader knots are very objectionable.

Having thus described the invention, I claim:

1. A method of making a loop at the end of an essentially long, flexible, tubular line, comprising the steps of inserting a needle through a longitudinal length of said line adjacent a terminal portion thereof so that the needle projects from the line away from said terminal portion, fastening the projecting end of the needle to said line and pulling a loop through said length of line, then pulling on said terminal portion to reverse said length of line on said loop, inserting the needle through a second longitudinal length of the line adjacent to but spaced from said first-mentioned section, fastening the needle to said terminal portion and pulling the same through said second length of line, then trimming said terminal portion at the point where it emerges from said line.

2. A tubular line having a main portion, and a terminal portion folded back against said main portion to define a loop in the line, said main portion extending through a longitudinal length of said terminal portion immediately adjacent said loop and the distal part of said terminal portion extending through a longitudinal length of said main portion and terminating in such main portion.

3. A tubular line having a main portion, and a terminal portion folded back against said main portion to define a loop in the line, said main portion extending through a longitudinal section of said terminal portion immediately adjacent said loop and the distal part of said terminal portion extending through a longitudinal section of said main portion.

4. A method of making a loop at the end of an essentially long, flexible, tubular line, comprising the steps of inserting a needle through a longitudinal length of said line adjacent a terminal portion thereof so that the needle projects from the line away from said terminal portion, fastening the projecting end of the needle to said line and pulling a loop through said length of line, then pulling on said terminal portion to reverse said length of line on said loop, inserting the needle through a second longitudinal length of the line adjacent to but spaced from said first-mentioned section, and fastening the needle to said terminal portion and pulling the same through said second length of line.

References Cited in the file of this patent

UNITED STATES PATENTS

| Number | Name | Date |
|---|---|---|
| 296,377 | Atwood | Apr. 8, 1884 |
| 338,216 | Atwood | Mar. 16, 1886 |
| 2,549,382 | Mitterway | Apr. 17, 1951 |
| 2,600,395 | Domoj et al. | June 17, 1952 |